June 30, 1964  R. H. GARDENER  3,139,518
HEATING ELEMENT
Filed Jan. 14, 1963  2 Sheets-Sheet 1
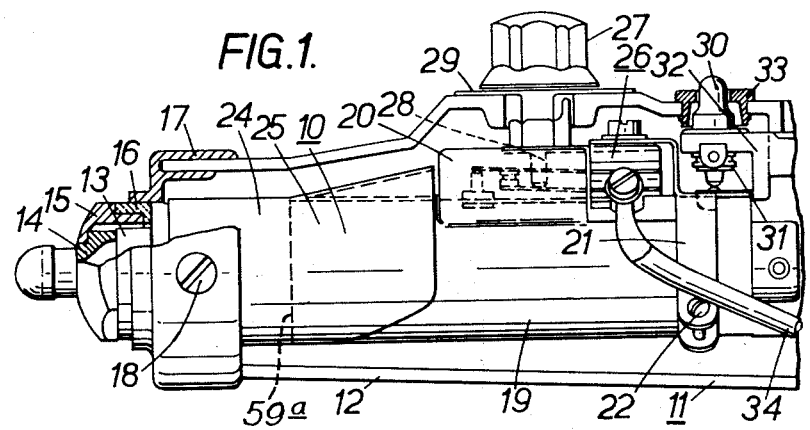
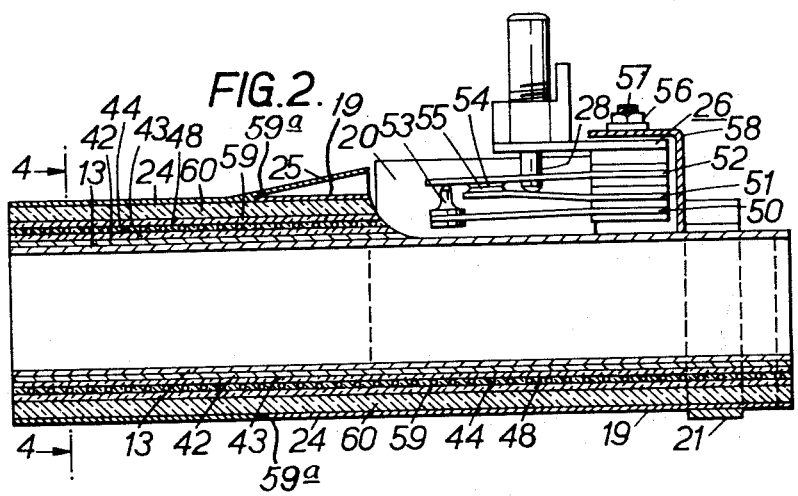
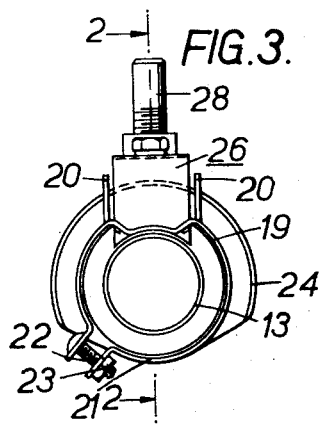
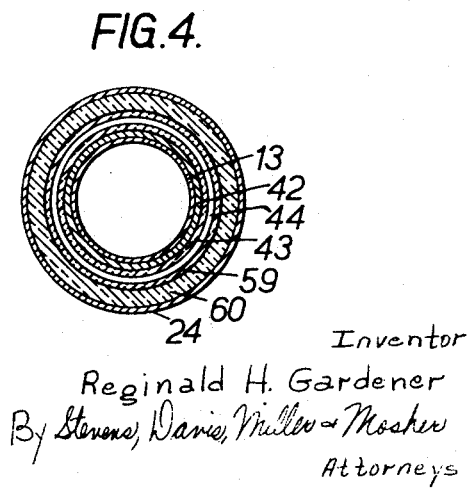
Inventor
Reginald H. Gardener
By Stevens, Davis, Miller & Mosher
Attorneys June 30, 1964  R. H. GARDENER  3,139,518
HEATING ELEMENT
Filed Jan. 14, 1963  2 Sheets-Sheet 2
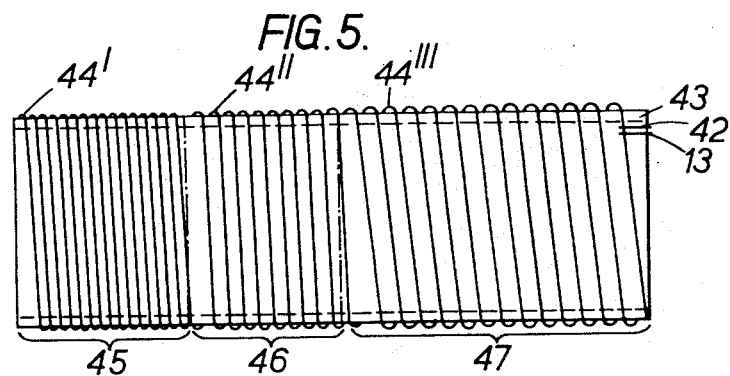
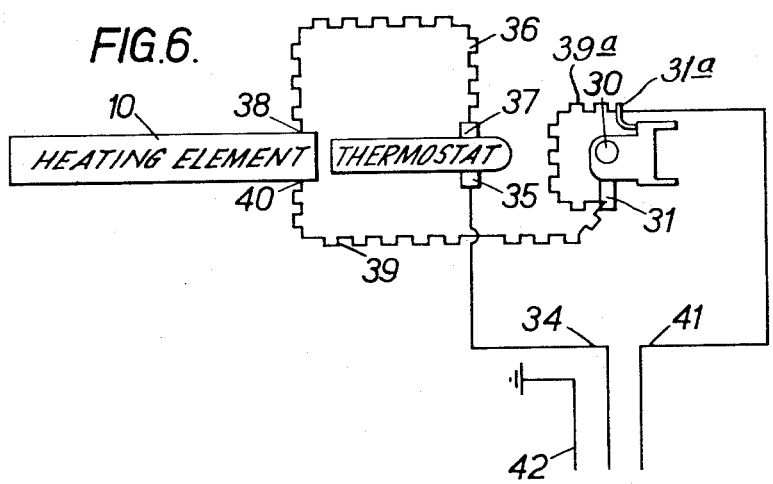
Inventor
Reginald H. Gardener
By Stevens, Davis, Miller & Mosher
Attorneys

United States Patent Office 3,139,518
Patented June 30, 1964

3,139,518
HEATING ELEMENT
Reginald Harry Gardener, Edmonton, Alberta, Canada, assignor to Northwest Industries Limited, Edmonton, Alberta, Canada
Filed Jan. 14, 1963, Ser. No. 251,210
Claims priority, application Canada Nov. 8, 1962
12 Claims. (Cl. 219—522)

This invention relates to a heating element. More particularly it relates to a tubular heating element which provides a plurality of different heating zones which can be controlled to selected temperatures.

There are instances where it is desired to heat a tube to different temperatures under controlled conditions. One of these applications is in the plastic extrusion gun disclosed in applicant's copending application Serial No. 173,283, filed February 14, 1962.

In that particular application there is disclosed a plastic extrusion gun wherein synthetic thermoplastic material is heated in a barrel and is later extruded in molten form. An important criterion in the use of such portable extrusion gun is a requirement of progressive heat for the melting of the thermoplastic material.

Accordingly one feature of the present invention is the provision of a heating element which provides for such progressive heating along the length of the tube through which the thermoplastic material is led.

One broad aspect of the present invention provides a heating element comprising: a tube of high heat conductivity, for example a thin copper tubing; a first thin sheet of a non-electrically conducting, high heat conducting material enveloping said tube (for example a thin sheet of mica impregnated with a silicone, which is a high heat conducting binder); heating coils wound around said thin sheet in continuous helical form of varying pitch and fixed to such position, whereby one end of said tube may be heated to a different temperature than the other end of said tube (for example, "V-ribbon Nichrome" wire, fixed in position by means of a spray of Saureisen cement); preferably, switching means in electrical connection with the heating element and most preferably an external thermostat; a second thin sheet of a non-electrically conducting high heat conducting material enveloping said heating elements (for example, mica impregnated with a silicone resin); a sleeve of non-electrically conducting high heat resisting material enveloping said second sheet (for example a relatively thick sleeve of asbestos); a third sheet of a high heat conductive material having a high heat reflective exterior surface enveloping a portion of said sleeve at the end of the tube which may be heated to the lower temperature, and preferably if the heating element includes the external thermostat, the third sheet including a pair of upstanding spaced apart parallel ears within whose boundaries the thermostat is located (for example, the third sheet may be formed of a thin copper sheet which is chrome plated both on the interior and the exterior surfaces); and a fourth sheet of a high heat conductive material having a high heat reflective surface enveloping the remaining portion of the sleeve at the end of the tube which may be heated to the higher temperature, a selected portion of the fourth sheet butting a terminal edge of the third sheet and flaring outwardly from a portion of the third sheet (for example the fourth sheet may also be formed of a thin sheet of copper which is chrome plated both on the exterior and the interior surfaces).

In the drawings which illustrate embodiments of the present invention,

FIG. 1 is a side elevation of the heating element of the present invention in its environment in a portable extrusion apparatus, FIG. 2 is a vertical cross section of the heating element of the present invention, FIG. 3 is a rear elevation of the element of FIG. 2, FIG. 4 is a vertical cross-section along the line 4—4 of FIG. 2, FIG. 5 is a side elevation of the heating element showing the heating coils, and FIG. 6 is a schematic wiring diagram for the heating element of this invention.

Turning first to FIG. 1, the heating element of this invention is indicated generally at 10 and is shown in its environment in a portable extrusion apparatus 11. The portable extrusion apparatus may suitably be the plastic extrusion gun disclosed in applicant's copending United States application Serial No. 173,283, filed February 14, 1962. As shown in FIG. 1, the apparatus 11 includes a casing 12 within which is a barrel 13, which barrel is enveloped by the heating element of this invention. The barrel 13 terminates in a nozzle 14 which is held to the barrel 13 by a nozzle adapter 15, an asbestos sleeve 16 and a nose cap 17, retained on the casing 12 by means of screw 18. The heating element 10 is provided with a primary heat reflecting shield 19, which is provided with a pair of upstanding wings 20. This part of the heating element is retained around the barrel 13 by a C-clamp 21, clamped in place by a bolt 22 and nut 23. The heating element 10 is also provided with a secondary heat reflecting shield 24, provided with an integral flared portion 25.

Control for the heating element 10 is provided by a thermostat, indicated generally at 26, whose structure and operation will be described hereinafter, actuated by a knob 27 on a spindle 28, in association with a dial 29 mounted on the casing 12. To indicate whether power is on, a bulb 30 is provided in the circuit, the bulb 30 being mounted in a socket 31 fixed to a bracket 32. A window 33 surrounds the bulb 30.

FIG. 6 shows the wiring diagram for the circuit. A lead wire 34 is connected to one pole 35 of the thermostat. A second wire 36, suitably of Nichrome, joins a second pole 37 of the thermostat to the terminal 38 of the heating coils of the heating element 10. A third wire 39, suitably of Nichrome, joins the terminal 40 of the heating element 10 to the inlet terminal of the bulb holder at 31. Wire 39a, which is an extension of wire 39, is bridged across the bulb holder terminals 31 and 31a. The length of wire 39a is such that the resistance thereof permits a reduced voltage of 1.5 to 3 volts to be applied to the bulb 30. An outlet line 41 leads from the bulb holder terminal 31. The lead wire is a three core wire and includes a grounded wire 42. The connections to the thermostat and the construction of the thermostat are such that current flows to the bulb 30 only when current is flowing to the heating coils of the heating element 10.

Turning now to FIGS. 2 and 4, it is seen that the barrel 13 is surrounded by the heating element 10 of the present invention. The heating element 10 comprises a tube 42 of high heat conductivity. A suitable material for such tube is copper, although other materials of high heat conductivity may be used. Enveloping such tube 24 is a first thin sheet 43 of a non-electrically conducting high heat conducting material. A suitable such material is mica, or mica which is impregnated with a high heat conducting binder, such as a silicone resin.

The heating coils 44 are then wound around the first thin sheet 43, in continuous helical form of varying pitch, and are fixed in such position. As shown in FIG. 5, the feeding section 45 of the heating element 10 is helically wound with wire 44' of close spacing and steep pitch. The mid-section 46 of the heating element 10 is helically wound with the integral extension of wire 44', as wire 44″ of greater spacing and lesser pitch. The terminal section 47 is helically wound with the integral extension of wires 44′ and 44″, as wire 44‴, of still greater spacing and still lesser pitch. By these means, one end of the heating element 10 can be heated to a different temperature than the mid-section of the heating element 10, which in turn can be heated to a still different temperature than the other end of the heating element 10. Any type of wire may be used for the heating coils, but it has been found that "V-ribbon Nichrome" wire is most suitable. Similarly, any means for fixing the wires 44 to the first thin sheet 43 may be used, but it has been found that a spray of the cement known by the registered trademark of "Saureisen," and designated as 48 in FIG. 2, is satisfactory. The wires 44 are then connected to the thermostat 26.

There are three terminals and leads therefrom on thermostat 26, namely metallic strip 50, bimetallic strip 51 and flexible metallic strip 52. Strip 50 is provided with a contact point 53 which contacts strip 52 to provide a closed circuit for the neon bulb circuit. Strip 52 is also provided with a contact disc 54 which is adapted to contact a contact disc 55 on bimetallic strip 51, which closes the circuit to the heating coils 44. In this way, the "on" and "cut-off" points between contact discs 54 and 55 can be adjusted by means of the spindle 28, and, because of the bimetallic strip 51, the temperature of the heating coil is automatically controlled. The thermostat is fixed to the heating element 10 by nut 56 on bolt 57 fixed to bracket 58.

Wrapped around wires 44 is a second thin sheet 59 of non-electrically conducting high heat conducting material. This second sheet may be of the same material as the first sheet 43.

Surrounding the second thin sheet 59 is a sleeve 60 of non-electrically conducting, high heat resisting material. This sleeve is preferably relatively thick, and may advantageously be made of asbestos or transite.

The final integers of the heating element 10 of this invention are the heat reflecting shields. The first heat reflecting shield 19 envelopes the terminal section 47 and the mid-section 46 of the heating element 10 and is formed of a high heat conductive material having a high heat reflective exterior surface. A suitable material is a thin copper sheet, which is chrome plated both on the interior and exterior surfaces. This shield 19 is provided with a pair of spaced apart parallel ears 20, within whose confines the thermostat 26 is located. This arrangement permits the thermostat to act more accurately, and not be unduly influenced by the excess heat of the heating element.

The second heat reflecting shield 24 envelopes the leading portion 45 of the heating element. It, too, is formed of a thin sheet of high heat conductive material having a high heat reflective external surface, and it may be the same as the material forming the first heat reflecting shield 19. This second heat reflecting shield 24 butts the terminal edge 59a of the first heat reflecting shield and the upper portion of the second heat reflecting shield 24 flares outwardly into a bell-shaped portion 25.

Because of the structure and arrangement of the integers of the heating element 10 it is possible to heat the contents of the barrel 13 to melt them. The temperature along the barrel 13 may be varied because of the different windings of wire 44′, 44″ and 44‴, and the thermostat controls the temperature. Because of the bell shaped flare 25, the heat is restricted inwardly towards the barrel 13 and the casing 12 remains substantially cooler than the barrel 13.

I claim:

1. A heating element comprising: a tube of high heat conductivity; a first thin sheet of a non-electrically conducting, high heat conducting material enveloping said tube; heating coils wound around said thin sheet in continuous helical form of varying pitch and fixed to such position, whereby one end of said tube may be heated to a different temperature than the other end of said tube; a second thin sheet of a non-electrically conducting high heat conducting material enveloping said heating elements, a sleeve of non-electrically conducting high heat resisting material enveloping said second sheet; a third sheet of a high heat conductive material having a high heat reflective exterior surface enveloping a portion of said sleeve at the end of the tube which may be heated to the lower temperature; and a fourth sheet of a high heat conductive material having a high heat reflective surface enveloping the remaining portion of the sleeve at the end of the tube which may be heated to the higher temperature, a selected portion of the fourth sheet butting a terminal edge of the third sheet and flaring outwardly from a portion of the third sheet.

2. A heating element comprising: a tube of high heat conductivity; a first thin sheet of a non-electrically conducting, high heat conducting material enveloping said tube; heating coils wound around said thin sheet in continuous helical form of varying pitch and fixed to such position, whereby one end of said tube may be heated to a different temperature than the other end of said tube; switching means in electrical connection with said heating coils; a second thin sheet of a non-electrically conducting high heat conducting material enveloping said heating elements; a sleeve of non-electrically conducting high heat resisting material enveloping said second sheet; a third sheet of a high heat conductive material having a high heat reflective exterior surface enveloping a portion of said sleeve at the end of the tube which may be heated to the lower temperature; and a fourth sheet of a high heat conductive material having a high heat reflective surface enveloping the remaining portion of the sleeve at the end of the tube which may be heated to the higher temperature, a selected portion of the fourth sheet butting a terminal edge of the third sheet and flaring outwardly from a portion of the third sheet.

3. A heating element comprising: a tube of high heat conductivity; a first thin sheet of a non-electrically conducting, high heat conducting material enveloping said tube; heating coils wound around said thin sheet in continuous helical form of varying pitch and fixed to such position, whereby one end of said tube may be heated to a different temperature than the other end of said tube; an external thermostat in electrical connection with said heating coils; a second thin sheet of a non-electrically conducting high heat conducting material enveloping said heating coils; a sleeve of non-electrically conducting high heat resisting material enveloping said second sheet; a third sheet of a high heat conductive material having a high heat reflective exterior surface enveloping a portion of said sleeve at the end of the tube which may be heated to the lower temperature, said third sheet including a pair of upstanding spaced apart parallel ears within whose boundaries the thermostat is located; and a fourth sheet of a high heat conductive material having a high heat reflective surface enveloping the remaining portion of the sleeve at the end of the tube which may be heated to the higher temperature, a selected portion of the fourth sheet butting a terminal edge of the third sheet and flaring outwardly from a portion of the third sheet.

4. A heating element comprising: a thin copper tube; a first thin sheet of a non-electrically conducting, high heat conducting material enveloping said tube; heating coils wound around said thin sheet in continuous helical form of varying pitch and fixed to such position, whereby one end of said tube may be heated to a different temperature than the other end of said tube; an external thermostat in electrical connection with said heating coils; a second thin sheet of a non-electrically conducting high heat conducting material enveloping said heating elements; a sleeve of non-electrically conducting high heat resisting material enveloping said second sheet; a third sheet of a high heat conductive material having a high heat reflective exterior surface enveloping a portion of said sleeve at the end of the tube which may be heated to the lower temperature, said third sheet including a pair of upstanding spaced apart parallel ears within whose boundaries the thermostat is located; and a fourth sheet of a high heat conductive material having a high heat reflective surface enveloping the remaining portion of the sleeve at the end of the tube which may be heated to the higher temperature, a selected portion of the fourth sheet butting a terminal edge of the third sheet and flaring outwardly from a portion of the third sheet.

5. A heating element comprising: a thin copper tube; a first thin sheet of mica impregnated with a silicone enveloping said tube; heating coils wound around said thin sheet in continuous helical form of varying pitch and fixed to such position, whereby one end of said tube may be heated to a different temperature than the other end of said tube; an external thermostat in electrical connection with said heating coils; a second thin sheet of a non-electrically conducting high heat conducting material enveloping said heating coils; a sleeve of non-electrically conducting high heat resisting material enveloping said second sheet; a third sheet of a high heat conductive material having a high heat reflective exterior surface enveloping a portion of said sleeve at the end of the tube which may be heated to the lower temperature, said third sheet including a pair of upstanding spaced apart parallel ears within whose boundaries the thermostat is located; and a fourth sheet of a high heat conductive material having a high heat reflective surface enveloping the remaining portion of the sleeve at the end of the tube which may be heated to the higher temperature, a selected portion of the fourth sheet butting a terminal edge of the third sheet and flaring outwardly from a portion of the third sheet.

6. A heating element comprising: a thin copper tube; a first thin sheet of mica impregnated with a silicone enveloping said tube; heating coils wound around said thin sheet in continuous helical form of varying pitch and fixed to such position, whereby one end of said tube may be heated to a different temperature than the other end of said tube, an external thermostat in electrical connection with the heating element; a second thin sheet of a non-electrically conducting high heat conducting material enveloping said heating coils; a sleeve of non-electrically conducting high heat resisting material enveloping said second sheet; a third sheet of a high heat conductive material having a high heat reflective exterior surface enveloping a portion of said sleeve at the end of the tube which may be heated to the lower temperature, said third sheet including a pair of upstanding spaced apart parallel ears within whose boundaries the thermostat is located; and a fourth sheet of a high heat conductive material having a high heat reflective surface enveloping the remaining portion of the sleeve at the end of the tube which may be heated to the higher temperature, a selected portion of the fourth sheet butting a terminal edge of the third sheet and flaring outwardly from a portion of the third sheet.

7. A heating element comprising: a thin copper tube; a first thin sheet of mica impregnated with a silicone resin enveloping said tube; heating coils wound around said thin sheet in continuous helical form of varying pitch and fixed to such position, whereby one end of said tube may be heated to a different temperature than the other end of said tube; an external thermostat in electrical connection with said heating coils; a second thin sheet of mica impregnated with a silicone resin enveloping said heating elements; a sleeve of non-electrically conducting high heat resisting material enveloping said second sheet; a third sheet of a high heat conductive material having a high heat reflective exterior surface enveloping a portion of said sleeve at the end of the tube which may be heated to the lower temperature, said third sheet including a pair of upstanding spaced apart parallel ears within whose boundaries the thermostat is located; and a fourth sheet of a high heat conductive material having a high heat reflective surface enveloping the remaining portion of the sleeve at the end of the tube which may be heated to the higher temperature, a selected portion of the fourth sheet butting a terminal edge of the third sheet and flaring outwardly from a portion of the third sheet.

8. A heating element comprising: a thin copper tube; a first thin sheet of mica impregnated with a silicone resin enveloping said tube; heating coils wound around said thin sheet in continuous helical form of varying pitch and fixed to such position, whereby one end of said tube may be heated to a different temperature than the other end of said tube; an external thermostat in electrical connection with said heating coils; a second thin sheet of mica impregnated with a silicone resin enveloping said heating elements; a relatively thick sleeve of asbestos enveloping said second sheet; a third sheet of a high heat conductive material having a high heat reflective exterior surface enveloping a portion of said sleeve at the end of the tube which may be heated to the lower temperature, said third sheet including a pair of upstanding spaced apart parallel ears within whose boundaries the thermostat is located; and a fourth sheet of a high heat conductive material having a high heat reflective surface enveloping the remaining portion of the sleeve at the end of the tube which may be heated to the higher temperature, a selected portion of the fourth sheet butting a terminal edge of the third sheet and flaring outwardly from a portion of the third sheet.

9. A heating element comprising: a thin copper tube; a first thin sheet of mica impregnated with a silicone resin enveloping said tube; heating coils wound around said thin sheet in continuous helical form of varying pitch and fixed to such position, whereby one end of said tube may be heated to a different temperature than the other end of said tube; an external thermostat in electrical connection with said heating coils; a second thin sheet of mica impregnated with a silicone resin enveloping said heating elements; a relatively thick sleeve of asbestos enveloping said second sheet; a third sheet of a thin copper sheet which is chrome plated both on the interior and the exterior surfaces enveloping a portion of said sleeve at the end of the tube which may be heated to the lower temperature, said third sheet including a pair of upstanding spaced apart parallel ears within whose boundaries the thermostat is located; and a fourth sheet of a high heat conductive material having a high heat reflective surface enveloping the remaining portion of the sleeve at the end of the tube which may be heated to the higher temperature, a selected portion of the fourth sheet butting a terminal edge of the third sheet and flaring outwardly from a portion of the third sheet.

10. A heating element comprising: a thin copper tube; a first thin sheet of mica impregnated with a silicone resin enveloping said tube; heating coils wound around said thin sheet in continuous helical form of varying pitch and fixed to such position, whereby one end of said tube may be heated to a different temperature than the other end of said tube; an external thermostat in electrical connection with said heating coils; a second thin sheet of mica impregnated with a silicone resin enveloping said heating elements; a relatively thick sleeve of asbestos enveloping said second sheet; a third sheet of a thin copper sheet which is chrome plated both on the interior and the exterior surfaces enveloping a portion of said sleeve at the end of the tube which may be heated to the lower temperature, said third sheet including a pair of upstanding spaced apart parallel ears within whose boundaries the thermostat is located; and a fourth sheet of a thin sheet of copper which is chrome plated both on the exterior and the interior surfaces enveloping the remaining portion of the sleeve at the end of the tube which may be heated to the higher temperature, a selected portion of the fourth sheet butting a terminal edge of the third sheet and flaring outwardly from a portion of the third sheet.

11. A heating element comprising: a thin copper tube; a first thin sheet of mica impregnated with a silicone resin enveloping said tube; heating coils of "V-ribbon Nichrome" wire wound around said thin sheet in continuous helical form of varying pitch and fixed to such position, whereby one end of said tube may be heated to a different temperature than the other end of said tube; an external thermostat in electrical connection with said heating coils; a second thin sheet of mica impregnated with a silicone resin enveloping said heating elements; a relatively thick sleeve of asbestos enveloping said second sheet; a third sheet of a thin copper sheet which is chrome plated both on the interior and the exterior surfaces enveloping a portion of said sleeve at the end of the tube which may be heated to the lower temperature, said third sheet including a pair of upstanding spaced apart parallel ears within whose boundaries the thermostat is located; and a fourth sheet of a thin sheet of copper which is chrome plated both on the exterior and the interior surfaces enveloping the remaining portion of the sleeve at the end of the tube which may be heated to the higher temperature, a selected portion of the fourth sheet butting a terminal edge of the third sheet and flaring outwardly from a portion of the third sheet.

12. A heating element comprising: a thin copper tube; a first thin sheet of mica impregnated with a silicone resin enveloping said tube; heating coils of "V-ribbon Nichrome" wire wound around said thin sheet in continuous helical form of varying pitch and fixed to such position by means of a spray of Saureisen cement whereby one end of said tube may be heated to a different temperature than the other end of said tube; an external thermostat in electrical connection with said heating coils; a second thin sheet of mica impregnated with a silicone resin enveloping said heating elements; a relatively thick sleeve of asbestos enveloping said second sheet; a third sheet formed of a thin copper sheet which is chrome plated both on the interior and the exterior surfaces of a high heat conductive material having a high heat reflective exterior surface enveloping a portion of said sleeve at the end of the tube which may be heated to the lower temperature, said third sheet including a pair of upstanding spaced apart parallel ears within whose boundaries the thermostat is located; and a fourth sheet formed of a thin sheet of copper which is chrome plated both on the exterior and the interior surfaces enveloping the remaining portion of the sleeve at the end of the tube which may be heated to the higher temperature, a selected portion of the fourth sheet abutting a terminal edge of the third sheet and flaring outwardly from a portion of the third sheet.

References Cited in the file of this patent

UNITED STATES PATENTS

| | | |
|---|---|---|
| 1,277,621 | Macklind | Sept. 3, 1918 |
| 1,809,714 | Mathews | June 9, 1931 |
| 1,995,302 | Goldstein | Mar. 26, 1935 |
| 3,019,325 | Clouse | Jan. 30, 1962 |

FOREIGN PATENTS

| | | |
|---|---|---|
| 220,465 | Switzerland | July 1, 1942 |

UNITED STATES PATENT OFFICE
CERTIFICATE OF CORRECTION

Patent No. 3,139,518 June 30, 1964

Reginald Harry Gardener

It is hereby certified that error appears in the above numbered patent requiring correction and that the said Letters Patent should read as corrected below.

In the drawing, Sheet 1, "FIG. 2", interchange numerals 50 and 51; column 2, line 50, for "31" read -- 31a --; line 62, for "24" read -- 42 --; column 3, line 19, for "Strip 50" read -- Bimetallic strip 51 --; line 23, for "bimetallic strip 51" read -- strip 50 --.

Signed and sealed this 3rd day of August 1965.

(SEAL)
Attest:

ERNEST W. SWIDER
Attesting Officer

EDWARD J. BRENNER
Commissioner of Patents